May 18, 1965 E. J. DERDERIAN 3,183,887
CARTON SEALING APPARATUS AND ADHESIVE DISPENSER THEREFOR
Filed Aug. 28, 1962
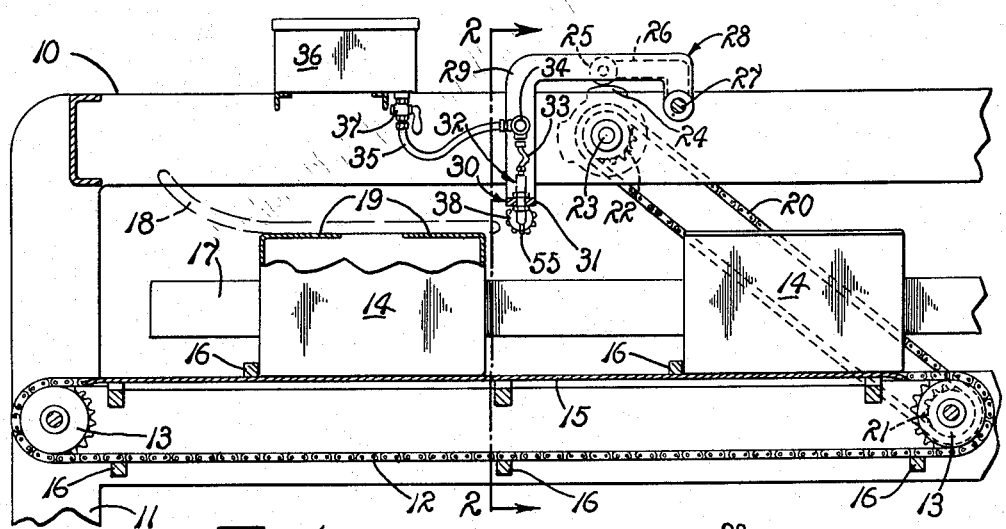
Fig. 1.
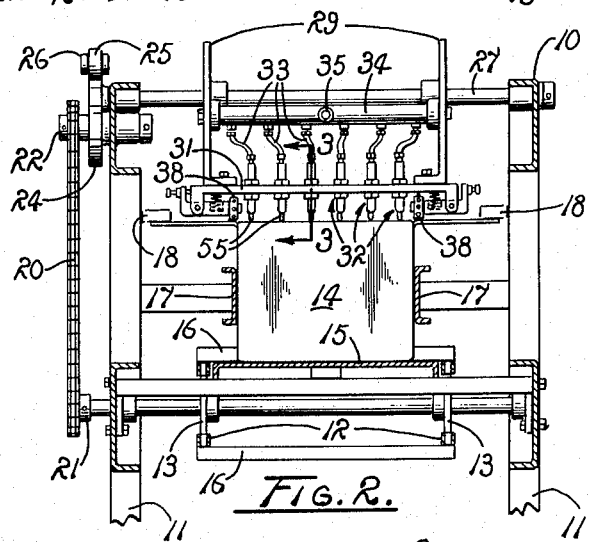
Fig. 2.
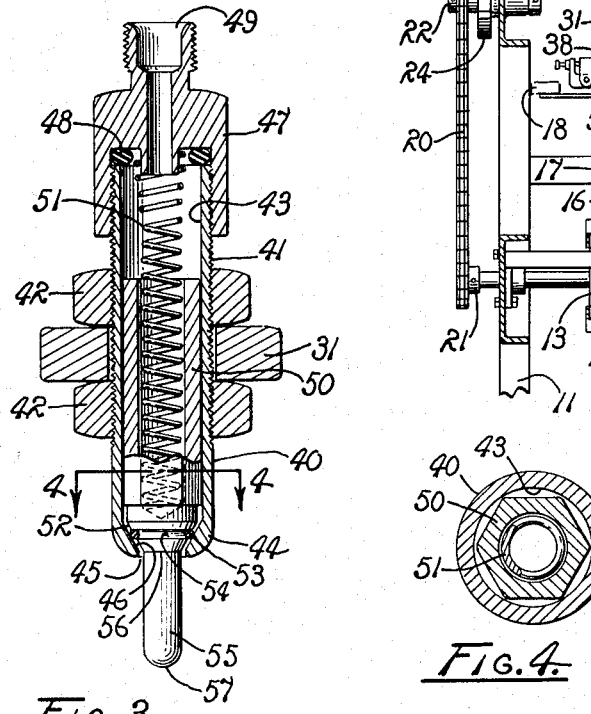
Fig. 3.
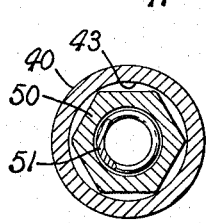
Fig. 4.
Fig. 5.
EDWARD J. DERDERIAN
INVENTOR
HUEBNER & WORREL
ATTORNEYS
BY
Richard M. Worrel

United States Patent Office 3,183,887
Patented May 18, 1965

3,183,887
CARTON SEALING APPARATUS AND
ADHESIVE DISPENSER THEREFOR
Edward J. Derderian, 4514 N. Wilson, Fresno, Calif.
Filed Aug. 28, 1962, Ser. No. 219,904
3 Claims. (Cl. 118—3)

The present invention relates to a carton sealing apparatus and adhesive dispenser therefor and more particularly to such an apparatus adaptable for use in sealing somewhat irregular cartons, such as those which have been stored for an extended period of time so that they depart in varied respects from nominal standard dimensions, as originally fabricated and to an adhesive dispenser adapted for use with the sealing apparatus of the present invention.

In the art of sealing fiberboard cartons, it is an accepted practice to utilize carton sealing apparatus capable of continuous automatic operation. Conventionally available apparatus are quite satisfactory in many instances, particularly, if the cartons to be sealed are of uniform configuration and dimensions and the fiberboard from which the cartons have been fabricated has not been damaged or deteriorated, as by storage for an extended period under adverse conditions. For cartons which have acquired a configuration departing from the intended norm, conventional apparatus is unsatisfactory. If the cartons sealed by such apparatus are subsequently to be shipped in interstate commerce, regulations relating to such shipment require that the cartons have a specified minimum surface area covered with adhesive between adjoining members. The apparatus available prior to the instant invention has been found to be unsatisfactory in meeting such requirements, or if the apparatus is capable of applying adhesive as required, it has been found to be uneconomical because of the quantity of adhesive utilized.

With certain types of cartons, it is desirable to apply the adhesive to the cartons in an uninterrupted band of predetermined width. In others, it is desirable to apply the adhesive in a plurality of parallel bands of lesser width. In certain instances, the adhesive is applied at intermittent intervals to create a spotted application on the carton. Conventional sealing apparatus and adhesive dispensers have been found to be incapable of desired precision of adhesive application and wasteful of adhesive even when utilized to dispense the adhesive in patterns within their capabilities. In view of the cost of modern adhesives, as well as the sealing requirements prescribed by governmental regulatory bodies, the carton sealing industry has vigorously endeavored to develop sealing apparatus that can accommodate an increased range of size and shape variations, that can apply adhesives in areas and patterns desired with precision, and which more accurately can meter adhesive application so as to minimize waste.

Still further, conventional carton sealing apparatus require frequent tedious cleaning to avoid clogging. Whenever operation of such apparatus is interrupted for any significant period, the adhesive applying systems thereof must be emptied and cleaned. Upon resumption of operation, they must be refilled and adjusted. Prior to the present invention, such onerous tasks were regarded as highly undesirable but unavoidable incidents of the use of automatic carton sealing apparatus.

Accordingly, it is an object of the present invention to provide an improved apparatus for sealing cartons.

Another object is to provide a carton sealing apparatus having improved efficiency of operation.

Another object is to permit the application of adhesive to cartons and the like with improved precision and quantity control.

Another object is to provide carton sealing apparatus which is adaptable for use in sealing cartons having variations in configuration and dimensions.

Another object is to provide carton sealing apparatus capable of intermittent operation without extensive cleaning between operating periods.

Another object is to provide apparatus adapted for applying adhesive to fiberboard cartons, and the like, in a variety of selective patterns of distribution.

Another object of the present invention is to provide a dispenser capable of discharging adhesive in a variety of discharge patterns.

A further object of the invention is to provide a dispenser actuated by contact with an object and capable of discharging adhesive, and the like, over a wide range of actuating movement.

A still further object is to provide an adhesive dispenser capable of discharging an air-curing adhesive in an efficient, economical manner and adapted for intermittent operation without cleaning between such periods of operation.

These, together with other objects, will become more fully apparent upon reference to the following description and accompanying drawing.

In the drawing:

FIG. 1 is a fragmentary view of an integrated carton sealing machine embodying the principles of the present invention, the view being partly in side elevation with portions shown in vertical, longitudinal section for purposes of clarity.

FIG. 2 is a view in vertical, transverse section, taken on line 2—2 of FIG. 1.

FIG. 3 is a somewhat enlarged view of one of the dispensers of the present invention taken on line 3—3 of FIG. 2.

FIG. 4 is a horizontal, transverse section taken on line 4—4 of FIG. 3.

FIG. 5 is a fragmentary view of the dispenser shown in FIG. 3 with an actuating plunger thereof shown in an open position.

The apparatus shown in FIG. 1 is a portion of an integrated carton sealing machine adapted for closing the flaps of fiberboard cartons, and the like. Portions of the machine are not shown, such as the delivery conveyor, and the synchronized means used to depress one of the upper flaps of the carton prior to the application of an adhesive. Since these undisclosed portions form no particular part of the present invention, and are well-known to those skilled in the art of carton sealing machines, they have not been shown so as not to encumber the illustration of the invention.

Referring to FIG. 1, a portion of a main frame is shown at 10 and includes a base 11. The frame is extended from left to right, as viewed in FIG. 1, and provides a longitudinal axis for the base extending in that direction and a predetermined path of travel parallel therethrough. A conveyor 12 is mounted in the base and is trained about a pair of longitudinally spaced sprockets 13 to provide upper and lower runs. The sprockets 13 constitute power drive means, and the source of power is not shown. The sprockets motivate the conveyor in a circuitous path in a clockwise direction, as shown in FIG. 1.

Fiberboard cartons 14 are motivated through the machine along the aforesaid path of travel on a support plate 15 providing an upwardly presented supporting surface for the cartons. The cartons slide along said surface when under propulsion by a plurality of transverse pusher bars 16 spaced at predetermined intervals along the conveyor 12. A pair of laterally opposed guide rails 17 defines the path of travel. A shoe 18 is mounted in the frame and is elevationally spaced above the support plate 15 to conform to the vertical dimensions of the cartons and depress the forward and rearward end flaps 19 of each carton. A flap depressor, not shown, is normally provided in connection with the shoe 18, and powered for movement synchronized with the conveyor 12.

A power transmission chain 20 interconnects a sprocket 21 and a cam shaft drive sprocket 22. The sprocket 21 is driven by the right-hand conveyor sprocket, as viewed in FIG. 1. The sprocket 22 is non-rotatably secured to a cam shaft 23 rotatably mounted in the frame 10. Secured to the shaft is a cam 24 provided with a profile and a circumferential dimension predetermined in accordance with the spacing of the propulsion bars 16. A cam follower 25 is rotatably mounted in an arm 26 fixed to a rock shaft 27 supported in the frame 10 for rotatable movement. Secured to the rock shaft is a dispenser frame 28, which includes a pair of laterally opposed arms 29. The arms project forwardly from the shaft 27 and depend toward the support plate 15.

A dispensing head, generally indicated at 30, is secured to the laterally opposed arms 29 and includes a mounting bar 31 transversely extended between the arms. A plurality of individual adhesive dispensers, or glue guns, 32 are secured to the mounting bar at intervals of lateral spacing predetermined in accordance with the gluing requirements of the particular carton to be sealed and the type of adhesive to be dispensed. Each of the glue guns is provided with individual supply lines 33 in fluid communication with a distributor manifold 34. The adhesive is supplied to the manifold by a primary supply line 35 from a reservoir 36 supported on the frame 10. Adhesive under pressure is admitted from the reservoir to the supply line by a shut off valve 37. The pressure may be the static head resulting from the elevated position of the reservoir or may be a result of pressurizing an adhesive reservoir, as design considerations suggest. The dispensing head 30 is also provided with a secondary cam 38 having a predetermined profile selected in accordance with the desired pattern of adhesive distribution.

One of the individual adhesive dispensers 32, which is particularly suitable for use with the apparatus of the present invention, is shown in FIG. 3. The dispenser has a valve body 40 providing an externally threaded surface 41 on which is threadably received a pair of jam nuts 42 in the manner shown in FIG. 3. A plurality of such glue dispensers are mounted in this manner on the bar 31, as shown in FIG. 2. The valve body is of a generally hollow cylindrical form to provide an internal cavity 43 of circular cross-section. The body 40 is longitudinally extended to provide a nozzle end 44 which terminates in a discharge orifice 45. The internal cavity 43 tapers toward the orifice 45 at the nozzle end to provide a valve seat, indicated at 46. At the opposite end of the body, a bonnet 47 is screw-threadably secured to the external surface 41 to compress an O-ring 48 interposed the bonnet and the body. The bonnet also provides an axially extended passageway terminating in an admission port 49, and the bonnet is adapted for connection with any of the supply lines 33 leading from the distributor manifold 34.

Flow from each of the dispensers 32 is controlled by a piston 50 which is longitudinally reciprocably received within the internal cavity 43 of the body. The piston is preferably of polygonal cross-section, and in the form illustrated, is hexagonal. It can be observed in FIG. 4, that the vertices of the piston result in a minimum area of contact with the surface of the internal cavity of the valve body. This same object can be achieved by reversing the relative configurations of the internal cavity of the valve body and the piston, that is, by forming the internal cavity with a polygonal cross-section and disposing therein a piston in the form of a right cylinder so that engagement between the two elements is limited to a plurality of line contacts.

The piston 50 is biased toward the nozzle end 44 of the body 40 by means of a spring 51. The piston is reduced in diameter at a tapered head portion 52 on which is carried an O-ring seal 53 received in an annular groove 54. The tapered head portion includes a projecting plunger 55 which is of a uniform diameter less than the diameter of the orifice 45. An annular discharge area in the orifice 45 is determined by the relative dimensions of the projecting plunger 55 and the orifice 45. The plunger 55 extends from a base 56 to a tip 57, thereby defining the effective operating length of the plunger. It is to be noted that the annular discharge orifice maintains a uniform area throughout the range of movement predetermined by the effective length of the plunger. This can be more readily observed by reference to FIG. 5.

Operation

The operation of the described embodiment of the subject invention is believed to be readily apparent and is briefly summarized at this point. It will be appreciated that the apparatus of the present invention is particularly suited to sealing fiberboard cartons and is useable in a variety of environments. An example of an adverse environment is that existing in connection with the canning of fruits and vegetables, wherein the cartons containing cans of such produce are frequently stored for protracted periods of time prior to sealing the cartons and shipment thereof. The produce is originally processed and canned and stored by the packer of such produce in unlabeled cans. Subsequently, upon receipt of an order for canned goods, the packer first removes the cans from the cartons, labels the cans, returns them to the cartons, and seals the cartons prior to shipment.

During the storage period prior to sealing, many of the bottom and top flaps of the cartons are deformed by the non-uniform pressure exerted on them by the cans and the contents thereof. Accordingly, many such cartons are mechanically deformed, and depending upon atmospheric conditions, many of them depart from their original forms and dimensions due to changes in moisture content, either by absorption or dehydration.

Upon returning the cans to the fiberboard cartons, they are introduced into the apparatus shown in FIG. 1 at the left end thereof, such introduction being either by hand or by automatic means such as that illustrated at 12. In addition to the mechanism illustrated, synchronized depresser apparatus may also be installed to fold the rearward upper flap inwardly. The shoe 18 then maintains the upper flaps 19 in the position shown in FIG. 1. The shoe 18 also spreads the side flaps to the position shown in FIG. 2 and maintains them during the period of adhesive application. Subsequent to such application, opposed guiding members, not shown, are employed to fold the flaps inwardly in contact with the glue so deposited; depending upon the type of adhesive and the curing period, additional means may be utilized to maintain the side flaps in contact with the upper flaps 19 under a predetermined pressure. Since the apparatus of the present invention is primarily concerned with the application of the adhesive, certain of these other elements are not shown, although normally employed in this type of carton sealing apparatus.

Upon the introduction of a carton 14 at the left-hand end of the machine, as viewed in FIG. 1, one of the transverse propulsion bars 16 motivates the carton through the machine along the predetermined path of travel defined by the guide rails 17. Since the cam shaft 23 is powered for movement synchronized with the conveyor 12 to which the propulsion bars 16 are secured, the cam 24 is of a profile to raise the dispenser frame 28 at a desired position of carton movement by means of the cam follower 25. The dispensing head 30 may be spring-biased, or biased gravitationally, as shown. Upon rotation of the cam shaft, the dispensing head 30 is alternately raised to an inoperative position, as shown in FIG. 1, and lowered to an operating position, wherein the tip 57 of each piston engages the upper flaps 19. The circumferential location and the dimensions of the cam lobes on the cam 24 are selected in relation to the longitudinal extent of the flaps. Accordingly, the dispensing head 30 is elevated to an inoperative position upon reaching the rearward limit of the foremost flap, and then is returned to an operating position upon reaching the forward limit of the rearward flap. After the carton 14 has progressed to the right beyond the dispensing head 30, the cam 24 again raises the dispensing head to an inoperative position, thereby allowing a subsequent carton to be positioned beneath the dispensing head.

In using certain types of adhesives, and in sealing certain types of cartons, it is desirable to use a continuous band, or ribbon, of adhesive extending transversely across the upper flaps 19. In such a situation, the individual adhesive dispensers 32 are disposed closely adjacent to one another so that their discharged streams of adhesive merge into such a transversely extended ribbon of adhesive. The transverse interval of spacing between adjacent dispensers, depends upon the viscosity of the adhesive and the area of the annular discharge orifice of each individual dispenser.

In the event that the upper flaps 19 have been deformed either through extended periods of storage or because of a change in the moisture content of the fiberboard, as compared to their originally fabricated state, the adhesive dispensers 32 readily conform to variations in the surface contour of the flaps 19. The effective length of the plunger 55 measured between the base 56 and the tip 57 can be predetermined in accordance with the magnitude of the variations to be accommodated. Upon raising the dispensing head 30 by means of the synchronized cam 24, the spring 51 urges the piston 50 toward the orifice until the O-ring seal 53 engages the valve seat 46. This precludes the entrance of air into the internal cavity 43 of the dispenser. Intermittent use of the carton sealing apparatus is thus permitted without cleaning each of the individual dispensers and without risk of the adhesive curing or hardening within the dispensers. The relative configurations of the piston 50 and the internal cavity 43 also insure rapid response of the piston in moving to open and closed positions. The relative configurations of these members provide a minimum surface area in mutual contact, which reduces the frictional drag between these members.

If it is desired that the adhesive be deposited upon the flaps 19 in separate bands or ribbons, the intervals of spacing between the individual dispensers 32 are increased to provide such a distribution pattern. With certain types of adhesives, it may also be desired to distribute the adhesive in interrupted bands, for example so as to achieve a series of circular spots of adhesive. This result can be achieved through the use of a secondary cam, indicated at 38. The profile of this cam is provided with a plurality of lobes to raise the dispensing head 30 at desired intervals corresponding to increments of linear travel of the carton 14. The cam profile can be predetermined to achieve any desired type of interrupted band of adhesive distribution.

With the apparatus disclosed, it can be seen that the dispensing head 30 can be disposed at any desired angle or attitude and that the use of primary and secondary cams provides a great flexibility of adhesive application. In addition, the design of the individual adhesive dispensers 32 permits the apparatus to conform to the surface configuration of the cartons which depart from nominal dimensions and configurations as originally manufactured. In addition, by the efficient application of the adhesives, the cost of sealing cartons has been greatly reduced. This is particularly so in the case of the damaged cartons, which normally require a great deal of particular attention, and in many cases manual sealing.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a carton sealing apparatus having a frame, conveyor means to advance a plurality of cartons along a path of travel at predetermined intervals of spacing, and power means to drive the conveyor means; the combination of an adhesive supply reservoir; adhesive dispenser means including normally closed flow control valve means engageable by the cartons and movable to an open position incident to engagement therewith; a conduit interconnecting the reservoir and the dispenser means; means mounting the dispenser means on the frame above the conveyor means for movement between a raised inoperative position and a lowered dispensing position; and power driven cam means operatively associated with the mounting means to effect movement of the dispenser means from one of said positions to the other; wherein said dispenser means includes an auxiliary cam carried by the dispenser means and provided with a profile surface adapted to engage the cartons whereby the dispenser means is lowered and raised toward and away from the cartons in accordance with said profile surface to dispense adhesive in a predetermined pattern on the cartons.

2. In a carton sealing apparatus having a main frame, a conveyor mounted thereon to advance a plurality of cartons along a path of travel at predetermined intervals of spacing, and power means to drive the conveyor; the combination of a reservoir as a supply of adhesive; a plurality of adhesive dispensers, each having a flow control valve and an actuating tip to open the valve incident to engagement with a carton; a manifold and conduit system establishing fluid communication between the reservoir and the dispensers; a dispenser frame pivotally mounted on the main frame and carrying the dispensers above said carton path of travel; a cam rotatably mounted in the main frame and having a profile surface; a cam follower supported on the dispenser frame; means to rotate the cam in synchronized movement with the conveyor to effect lowering and raising of the dispensers in timed sequence with the cartons spaced on the conveyor; and an auxiliary cam carried by the dispenser frame and engageable by the cartons to raise and to lower the dispensers incident to rotation of the cam upon engagement by a carton thereby to effect a predetermined pattern of adhesive distribution on the cartons.

3. The carton sealing apparatus of claim 2 wherein said dispenser frame comprises a pair of laterally opposed arms secured to a rock shaft rotatably mounted in the main frame and the frame is gravitationally biased toward the conveyor and wherein a dispenser mounting bar is transversely extended between said arms and a plurality of individual adhesive dispensers are carried by the bar at selectively adjustable intervals of transverse spacing.

References Cited by the Examiner

UNITED STATES PATENTS

| | | | |
|---|---|---|---|
| 1,987,500 | 1/35 | Wild | 118—211 X |
| 2,062,900 | 12/36 | Nagy | 118—3 |
| 2,199,947 | 5/40 | Benofsky et al. | 222—501 |
| 2,208,636 | 7/40 | Johnson | 118—3 |
| 2,346,951 | 4/44 | Temple | 118—3 |
| 2,530,199 | 11/50 | Henson | 118—3 X |
| 2,896,569 | 7/59 | Ferguson et al. | 118—3 |

RICHARD D. NEVIUS, *Primary Examiner.*

JOSEPH B. SPENCER, *Examiner.*